(12) United States Patent
Chen et al.

(10) Patent No.: US 9,872,166 B2
(45) Date of Patent: Jan. 16, 2018

(54) APPARATUS AND METHOD FOR PROVIDING POSITIONING DATA BASED ON AUTHENTICATION RESULT

(71) Applicant: Marvell World Trade Ltd., St. Michael (BB)

(72) Inventors: Jian Chen, Shanghai (CN); Yuan Ren, Shanghai (CN); BoChih Liu, Shanghai (CN); Zhike Jia, Fremont, CA (US); Jing Yu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 88 days.

(21) Appl. No.: 14/837,309

(22) Filed: Aug. 27, 2015

(65) Prior Publication Data

US 2016/0173470 A1    Jun. 16, 2016

Related U.S. Application Data

(60) Provisional application No. 62/091,838, filed on Dec. 15, 2014.

(51) Int. Cl.
| | |
|---|---|
| *H04W 8/18* | (2009.01) |
| *H04W 12/06* | (2009.01) |
| *H04W 4/02* | (2009.01) |
| *H04L 29/06* | (2006.01) |
| *H04W 12/08* | (2009.01) |
| *H04W 64/00* | (2009.01) |

(52) U.S. Cl.
CPC .......... *H04W 8/18* (2013.01); *H04L 63/0876* (2013.01); *H04W 4/02* (2013.01); *H04W 4/025* (2013.01); *H04W 12/06* (2013.01); *H04W 12/08* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 8,099,104 | B2* | 1/2012 | Loushine | H04W 64/00 370/331 |
| 8,229,454 | B1* | 7/2012 | Yoakum | H04M 3/42357 455/414.2 |
| 9,129,316 | B2* | 9/2015 | Lotvin | G06Q 20/02 |
| 9,524,594 | B2* | 12/2016 | Ouyang | G07C 9/00111 |
| 2004/0203869 | A1* | 10/2004 | Annamalai | G01S 19/09 455/456.1 |
| 2006/0009247 | A1* | 1/2006 | Kelley | H04L 63/062 455/515 |
| 2008/0172734 | A1* | 7/2008 | Sugimoto | G06F 21/43 726/19 |
| 2008/0244076 | A1* | 10/2008 | Shah | H04W 4/02 709/227 |

(Continued)

*Primary Examiner* — Trang Doan

(57) ABSTRACT

Aspects of the disclosure include a technique for providing positioning data based on an authentication result. The technique includes receiving authentication information that is associated with a wireless device. An authentication process is performed for the wireless device based on a corresponding set of authentication information. An authorized wireless device is provided with a set of positioning data that aids positioning circuitry of the wireless device to determine a location of the wireless device.

15 Claims, 6 Drawing Sheets

(56) References Cited

U.S. PATENT DOCUMENTS

| | | | |
|---|---|---|---|
| 2009/0063847 A1* | 3/2009 | Haynes | H04L 63/0492 713/150 |
| 2009/0065578 A1* | 3/2009 | Peterson | G05B 19/048 235/382 |
| 2010/0077458 A1* | 3/2010 | Stout | G06F 21/6218 726/4 |
| 2010/0124910 A1* | 5/2010 | Eich | H04L 67/18 455/414.1 |
| 2011/0055862 A1* | 3/2011 | Harp | H04N 7/17318 725/25 |
| 2012/0239942 A1* | 9/2012 | Yan | H04L 63/0421 713/189 |
| 2014/0056165 A1* | 2/2014 | Siomina | H04B 1/7083 370/252 |
| 2014/0250181 A1* | 9/2014 | Proud | H01F 38/14 709/204 |
| 2014/0375431 A1* | 12/2014 | Cristache | G01S 13/876 340/10.1 |
| 2015/0024782 A1* | 1/2015 | Edge | H04W 4/04 455/456.3 |
| 2016/0205513 A1* | 7/2016 | Choudhry | G01C 21/206 455/404.2 |

* cited by examiner

APPARATUS AND METHOD FOR PROVIDING POSITIONING DATA BASED ON AUTHENTICATION RESULT

INCORPORATION BY REFERENCE

This present disclosure claims the benefit of U.S. Provisional Application No. 62/091,838, "Embedded Authentication System in A Wireless Device for Providing Positioning-Aided Data" filed on Dec. 15, 2014, which is incorporated herein by reference in its entirety.

FIELD

This disclosure relates generally to providing positioning data based on an authentication result. More specifically, the disclosure relates to apparatus and methods for performing an authentication process for a wireless device and providing a set of positioning data to the wireless device if the wireless device is an authorized device.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many applications running on an electrical device that is capable of wirelessly accessing a network, i.e., a wireless device, such as a laptop computer, a tablet computer, a smart phone, and the like, depend on location information of the wireless device. The location information can be determined by positioning circuitry of the wireless device based on signals from satellites and/or wireless stations, the location information of the satellites and/or wireless stations, and/or other signal characteristic parameters. In some applications, the location information of the satellites and/or wireless stations or the parameters can be obtained based on decoding the received signals therefrom and/or performing a predetermined estimation process by the wireless device. In some applications, a set of positioning data including one or more of the location information of the satellites and/or wireless stations, the parameters, or intermediate results or the predetermined estimation process relevant to determine a current location of a wireless device can be downloaded from a server. Therefore, the set of positioning data aids the positioning circuitry of the wireless device to determine the location of the wireless device by reducing the computational resources of the wireless device and/or to expediting the process of obtaining the location information of the satellites and/or wireless stations or parameters.

SUMMARY

Aspects of the disclosure provide a method. The method includes receiving authentication information that is associated with a wireless device. The method further includes performing an authentication process for the wireless device based on a corresponding set of authentication information, and providing an authorized wireless device with a set of positioning data that aids positioning circuitry of the wireless device to determine a location of the wireless device.

In an embodiment, performing the authentication process includes retrieving subscription information from the set of authentication information, determining whether the subscription information is valid based on time information, and authorizing the wireless device when the subscription information is valid.

In an embodiment, performing the authentication process includes sending the set of authentication information to a server, and receiving the set of positioning data from the server when the wireless device is authorized.

In an embodiment, the method further includes generating the set of authentication information. In an embodiment, generating the set of authentication information includes retrieving an device ID corresponding to communication circuitry of the wireless device or corresponding to the positioning circuitry of the wireless device, and encrypting the device ID as an encrypted ID code of the set of authentication information.

Aspects of the disclosure provide an apparatus. The apparatus includes a storage device and an authentication system. The storage device is configured to store a set of authentication information. The authentication system is configured to perform an authentication process based on the set of authentication information, and to authorize access to a set of positioning data in response to a passing result of the authentication process.

In an embodiment, the authentication system includes a data detector, a data encryptor, and a data collector. The data detector is configured to retrieve a device ID of communication circuitry of the wireless device or positioning circuitry of the wireless device. The data encryptor is configured to encrypt the device ID as an encrypted ID code. The data collector is configured to include the encrypted ID code in the set of authentication information.

In an embodiment, the authentication system includes a data decryptor and a validity checker. The data decryptor is configured to retrieve subscription information from the set of authentication information. The validity checker is configured to compare the subscription information and time information to determine if the subscription information expires.

Aspects of the disclosure provide another method. The method includes receiving a set of authentication information from a wireless device, and determining whether an encrypted ID code of the set of authentication information has a match in an authentication record, without performing a decryption process on the encrypted ID code. The method further includes transmitting an authentication result to the wireless device based on whether the encrypted ID code has a match in the authentication record.

In an embodiment, transmitting the authentication result includes sending a set of positioning data that corresponds to a value of a flag of the set of authentication information to the wireless device when the encrypted ID code has a match in the authentication record.

In an embodiment, the method further includes, when the encrypted ID code fails to have a match in the authentication record, determining whether the wireless device is valid based on an authentication file of the set of authentication information, obtaining subscription information based on the authentication file when the wireless device is valid, determining whether the subscription information is valid, and sending the set of positioning data that corresponds to a value of a flag of the set of authentication information to the wireless device when the wireless device and the subscription information are valid.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
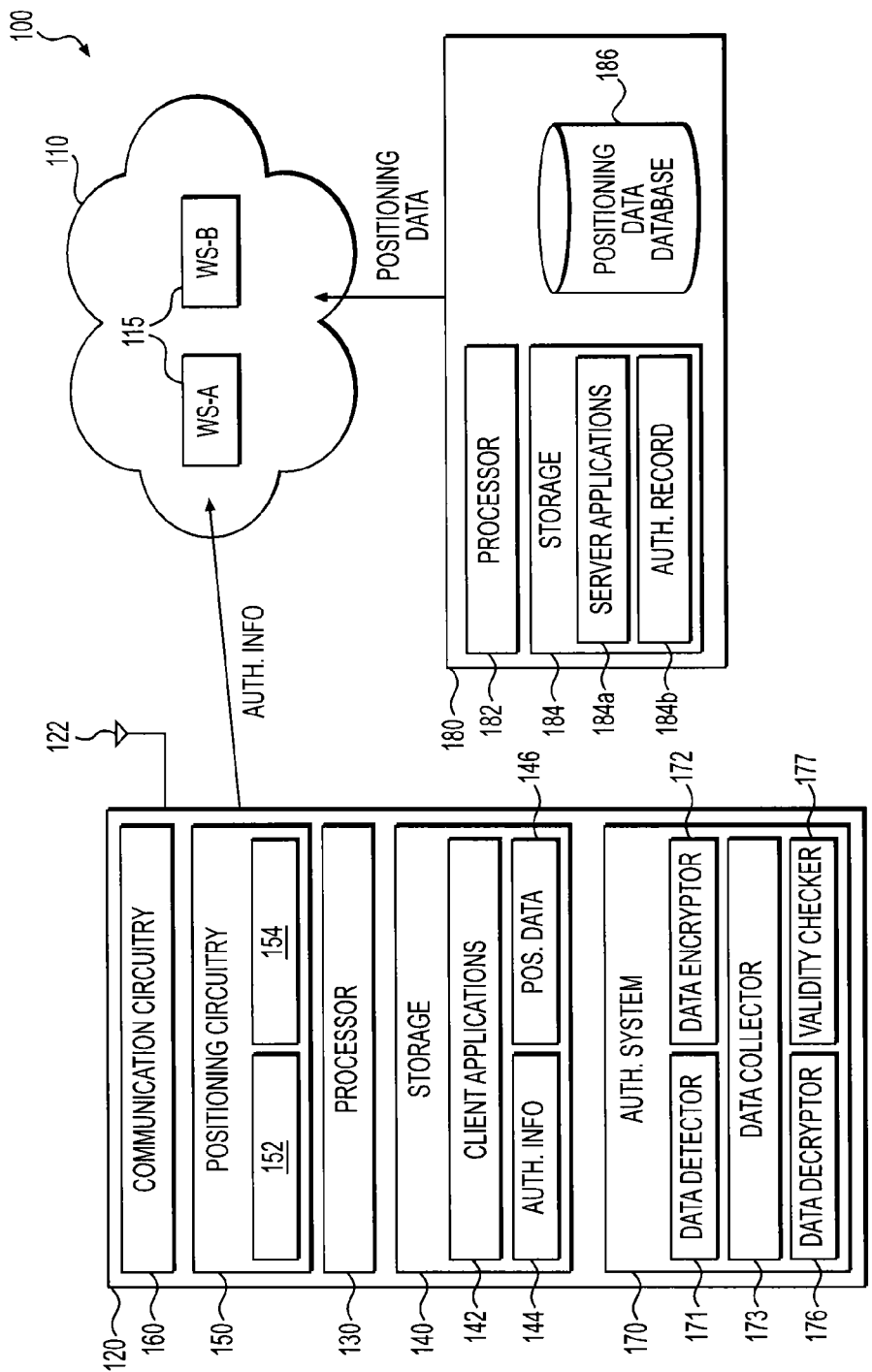
FIG. 1 shows a diagram of a positioning system example 100 according to an embodiment of the disclosure.

FIG. 1 shows a diagram of a positioning system example 100 according to an embodiment of the disclosure. The system 100 includes a network 110, a wireless device 120, and a server 180. The network 110 includes a plurality of wireless stations 115, such as wireless stations WS-A and WS-B, configured to communicate with the wireless device 120 via wireless signals and to communicate with the server 180 via wireless and/or wired signals. The server 180 stores a database of positioning data 186. Each set of positioning data is usable to aid positioning circuitry 150 of the wireless device 120 to determine a location of the wireless device 120. In some embodiments, a set of positioning data that was downloaded from the server 180 is stored in the wireless device 120.

According to an aspect of the disclosure, a wireless device 120 can include a positioning circuitry 150. The positioning circuitry 150 can include satellite-based positioning circuitry 152 and wireless station-based circuitry 154. In some embodiments, a set of positioning data stored in server 180 may be usable by satellite-based positioning circuitry 152 of the wireless device 120 and includes satellite orbit data, clock data, earth orientation parameters (EOP), or other usable data. The set of positioning data may be used to calculate the location information of the satellites, such as a satellite ephemeris, in order to improve the time to first fix (TTFF) of the positioning circuitry of the wireless device 120.

In some embodiments, a set of positioning data stored in server 180 may be usable by wireless station-based positioning circuitry 154 of the wireless device 120 and includes locations of wireless stations, the medium access control (MAC) addresses of wireless stations, or other usable data. The set of positioning data may be used to identify the location information of the wireless stations 115, which is usable by the wireless station-based positioning circuitry 154 of the wireless device 120 to triangulate the location of the wireless device.

In some examples, the positioning data may be confidential information or may be information that has monetary values. Therefore, the service provider who collects and maintains the positioning data may want to limit the access to the offered positioning data to authorized devices only. According to an aspect of the disclosure, the wireless device 120 has an authentication system 170. In order to access a set of positioning data stored in the wireless device 120 or in the server 180, an authentication process is performed to determine if the wireless device 120 is authorized. In one example, the authentication process is an offline authentication process performed by the wireless device 120. In one example, the authentication process is an online authentication process performed by the wireless device 120 and the server 180.

In the FIG. 1 example, the network 110 includes a single network or a plurality of networks of the same or different types. In an example, the network 110 includes a fiber optic network in connection with a cellular network. Further, the network 110 can be a data network or a telecommunications or video distribution (e.g., cable, terrestrial broadcast, or satellite) network in connection with a data network. Any combination of telecommunications, video/audio distribution and data networks, whether a global, national, regional, wide-area, local area, or in-home network, can be used without departing from the spirit and scope of the disclosure.

According to an embodiment of the disclosure, the wireless stations 115 can be cellular base stations in a cellular network. Each wireless station 115 is configured according to various cellular technologies, such as global system for mobile (GSM), code division multiple access (CDMA), wideband code division multiple access (WCDMA), time division synchronous code division multiple access (TD-SCDMA), long term evolution (LTE), time-division long term evolution (TD-LTE), and the like to use radio frequency signals to communicate with the wireless device 120. The cellular base station of a cellular network can broadcast a beacon signal providing an identifier (e.g., cell global identifier) for the wireless device 120 to establish communication with the cellular base station when the wireless device 120 is within a communication range of the cellular base station. In some embodiments, a plurality of cellular base stations may be available to a wireless device for connection.

As shown in FIG. 1 example, wireless device 120 can be connected to cellular base station WS-A, and cellular base station WS-A can be a serving base station for the wireless device 120. The serving base station WS-A can provide the wireless device 120 with telephony services and/or can relay the transmission, by providing communication access to a wide area network (WAN), such as the Internet, by use of a gateway, to the server 180. While the wireless device 120 is wireless-connected to the serving base station WS-A, the wireless device 120 may receive beacon signals from a neighboring base station WS-B.

According to another embodiment of the disclosure, the wireless stations 115 can be access points in a wireless local area network (LAN) or a wireless personal area network (PAN). Each wireless station 115 is configured according to various communication protocols, such as an Institute of Electrical and Electronics Engineers (IEEE) 802.11 based protocol (e.g., WiFi™ network) or an IEEE 802.15 based protocol (e.g., Bluetooth™ network), to use radio frequency signals to communicate with the wireless device 120. The access point can broadcast a beacon signal providing an identifier (e.g., medium access control (MAC) address) for the wireless device 120 to establish communication with the access point when the wireless device 120 is within a communication range of the access point. In some embodiments, a plurality of access points can be available to a wireless device for connection. Those identifiers need not be associated with access points to which wireless device is connected or can connect.

As shown in FIG. 1 example, wireless device 120 is located within a communication range of access point WS-A in addition to access point WS-B. Wireless device 120 can identify access points WS-A and WS-B according to the wireless communication protocol used in a WiFi network. Access points WS-A and WS-B can be identified by MAC addresses of the access points. Access point WS-A can relay the transmission, by providing communication access to a WAN, such as the Internet, to the server 180.

According to another embodiment of the disclosure, the wireless stations 115 include a first plurality of cellular base stations in a cellular network, and a second plurality of access points in a wireless LAN. For example in one embodiment, the wireless station WS-A is a cellular base station, and the wireless station WS-B is a WLAN access point. In some embodiments, the wireless device 120 can be wireless-connected to the cellular base station WS-A, and the cellular base station WS-A can be the serving base station for the wireless device 120. The serving base station WS-A can provide the wireless device 120 with telephony services and/or network (e.g., Internet) access. While the wireless device 120 is connected to serving base station WS-A, wireless device may receive beacon signals from the access point WS-B.

The wireless device 120 can be any type of wireless device, such as a laptop computer, tablet computer, smart phone, wearable electronic device, and the like that is configured to communicate with the wireless stations 115 using wireless signals. A wireless device 120 can include an antenna 122, a processor 130 for executing instructions, storage device 140 for storing the instructions, the positioning circuitry 150 for determining a location of the wireless device 120, communication circuitry 160 for communicating with the network 110 via the antenna 122, and an authentication system 170 for performing an authentication process.

The processor 130 includes a single processing core or multiple processing cores. The processor 130 is configured to execute an operation system and various client applications to perform various functions. In some embodiments, the processor 130 by executing instructions is capable of managing and processing the positioning data into a form that is usable by the positioning circuitry 150. For example, the processor 130 is configured to execute a corresponding application to calculate the satellite ephemeris based on the received positioning data.

The storage device 140 is used to store an operation system (not shown), client applications 142, a set of authentication information 144, a set of positioning data 146, and/or other data, intermediate data, or software programs. In some embodiments, storage device 140 includes a non-transitory computer readable medium, such as a semiconductor or solid-state memory, a random access memory (RAM), a read-only memory (ROM), a hard disk, an optical disk, or other suitable storage medium. In some embodiments, storage device 140 includes a plurality of non-transitory computer readable mediums listed above.

The positioning circuitry 150 includes satellite-based positioning circuitry 152 and wireless station-based circuitry 154. In some embodiments, the positioning circuitry 150 determines the location of the wireless device 120 using a positioning result from only one of the satellite-based positioning circuitry 152 and wireless station-based circuitry 154. In some embodiments, the positioning circuitry 150 determines the location of the wireless device 120 using the positioning results from the satellite-based positioning circuitry 152 and wireless station-based circuitry 154.

The satellite-based positioning circuitry 152 receives signals from satellites. In an embodiment of the present disclosure, the satellite signals are in compliance with a predetermined format of a satellite navigation system. In one embodiment, the signals include transmission timing information and satellite location information. Based on the received signals, the satellite-based positioning circuitry 152 calculates distances from the wireless device 120 to the satellites. Then, the distances to the satellites and the satellite location information are used to determine the location of the wireless device 120. In some embodiments, the satellite-based positioning circuitry 152 obtains the satellite location information or other parameters from the set of positioning data in order to expedite the positioning process. In some embodiments, the satellite navigation system includes U.S. Global Positioning System (GPS), Russian Global Navigation Satellite System (GLONASS), EU Galileo system, Chinese BeiDou-2 System, or the like.

The wireless station-based circuitry 154 measures the signal strengths from wireless stations, such as wireless stations WS-A and WS-B. Based on the measurements, the wireless station-based circuitry 154 calculates distances from the wireless device 120 to the wireless stations. Then, the distances to the wireless stations and the wireless station location information are used to determine the location of the wireless device 120. In some embodiments, the wireless station-based circuitry 154 determines the wireless station location information based on information embedded in the beacon signals from the wireless stations. In some embodiments, the wireless station-based circuitry 154 obtains the wireless station location information or other parameters from the set of positioning data in order to expedite the positioning process.

The communication circuitry 160 includes a receiving circuit (not shown), a transmitting circuit (not shown), a baseband circuit (not shown), and the like, to enable wireless communication with the wireless stations 115. In some embodiments, the communication circuitry 160 is configured to communicate with the network 110 according to one or more communication protocols, such as GSM, CDMA, WCDMA, TD-SCDMA, LTE, TD-LTE, an IEEE 802.11 based protocol, an IEEE 802.15 based protocol, or the like.

The authentication system 170 includes a data detector 171, a data encryptor 172, a data collector 173, a data decryptor 176, and a validity checker 177. In one example, the data detector 171, data encryptor 172, and data collector 173, in conjunction with the server 180, are usable to perform an online authentication process in order to authorize the wireless device to access a set of positioning data stored in the server 180. In another example, the data decryptor 176 and validity checker 177 are usable to perform an offline authentication process in order to authorize the wireless device to access a set of positioning data stored in the storage device of the wireless device. In one embodiment, the authentication system 170 is not configured to perform the online authentication process and thus does not include the data decryptor 176 and validity checker 177. In one embodiment, the authentication system 170 is not configured to perform the offline authentication process and thus does not include the data detector 171, data encryptor 172, and data collector 173.

The data detector 171 is configured to retrieve a device ID of the communication circuitry 160 or the positioning circuitry 150. In one embodiment, the device ID is usable to identify if the wireless device 120 is an authorized wireless device to which the set of positioning data can be provided. In some embodiments, the device ID of the communication circuitry 160 includes an International Mobile Equipment Identity (IMEI) number, a Media Access Control (MAC)

address, a chip serial number, a chip model number, or manufacturer identification information of the communication circuitry 160, or other applicable identification information. In some embodiments, the device ID of the positioning circuitry 150 includes a chip serial number, a chip model number, or manufacturer identification information of the communication circuitry 160, or other suitable identification information. In some embodiments, the device ID is stored in the storage device 140. In some embodiments, the device ID is stored in the set of authentication information 144. In one example, the device ID is stored in an encrypted portion of the authentication file of the set of authentication information. In one example, the device ID is stored in an unencrypted portion of the authentication file of the set of authentication information.

The data encryptor 172 is configured to encrypt the device ID as an encrypted ID code. In some embodiments, encrypted ID code is a hash code having a predetermined, fixed code length. In one embodiment, the encrypted ID code, while remains encrypted, is also usable to identify if the wireless device 120 is authorized. Compared with identifying a wireless device using device ID associated therewith, identifying the wireless device using the encrypted ID code adds an additional layer of privacy protection. In one embodiment, the encrypted ID code is transmitted to the server 180 and stored in an authentication record in the server 180 when the wireless device 120 has been authenticated. In one embodiment, a subsequent authentication process may be simplified by comparing the encrypted ID code from the wireless device 120 and the encrypted ID code stored in the server.

The data collector 173 generates or manages a set of authentication information usable to be sent to the server 180. The data collector 173 is configured to include the encrypted ID code, a flag indicating a type of the set of positioning data to be used by the positioning circuitry 150 of the wireless device 120, and/or an authentication file including information associated with the wireless device 120 into the set of authentication information. In an example, the data collector 173 is configured to set a flag value of the flag based on the type of the set of positioning data that is being requested by the positioning circuitry 150. Details with respect to the set of authentication information are further explained in conjunction with FIG. 2.

The data decryptor 176 is configured to retrieve subscription information from the set of authentication information. In one embodiment, the subscription information specifies the time period that the wireless device 120 is authorized to access the set of positioning data 146 stored in storage device 140. In some embodiments, the subscription information is determined and provided by a manufacture of the positioning circuitry 150 or communication circuitry 160 or a manufacture of the wireless device 120. In some embodiments, the subscription information is determined and provided by a service provider that generates, maintains, and/or provides the positioning data.

In one example, the subscription information is encrypted and stored in an encrypted portion of the authentication file of the set of authentication information. In such example, data decryptor 176 is configured to retrieve the subscription information by decrypting the encrypted portion of the authentication file of the set of authentication information based on a key of the authentication file.

The validity checker 177 is configured to compare the subscription information and time information to determine if the subscription information expires. In one embodiment, the time information is retrieve from the positioning circuitry 150 of the wireless device 120, which is time information provided by satellites or wireless stations through wireless signals.

The server 180 includes a processor 182, storage device 184, and a positioning data database 186. In an example, the server 180 can include more than one processors and storage media. In an example, the server 180 is implemented using a distributed system that includes multiple processors, and/or multiple storage devices coupled together by a network. The storage device 184 stores server applications 184*a* to be executed by the processor 182 and an authentication record 184*b*. The processor 182 corresponds to the processor 130; and the storage device 184 corresponds to the storage device 140. Therefore, detailed description for the processor 182 and storage device 184 are omitted. Also, in one example, the positioning data database 186 corresponds to another storage device for storing the positioning data. In one example, the positioning data database 186 is stored in the storage device 184.

In some embodiments, the authentication record 184*b* includes a list of encrypted ID codes associated with authorized wireless devices. In some embodiments, the authentication record 184*b* includes authentication files associated with authorized wireless devices and/or subscription information associated with authorized wireless devices. In one example, the authentication record 184*b* includes information provided by a manufacture of wireless devices and/or of integrated circuit chips corresponding to the positioning circuitry 150, the communication circuitry 160, or other components of a wireless device. In one example, the authentication record 184*b* includes information provided by a service provider that provides the positioning data of the positioning data database 186.

Figure 2:
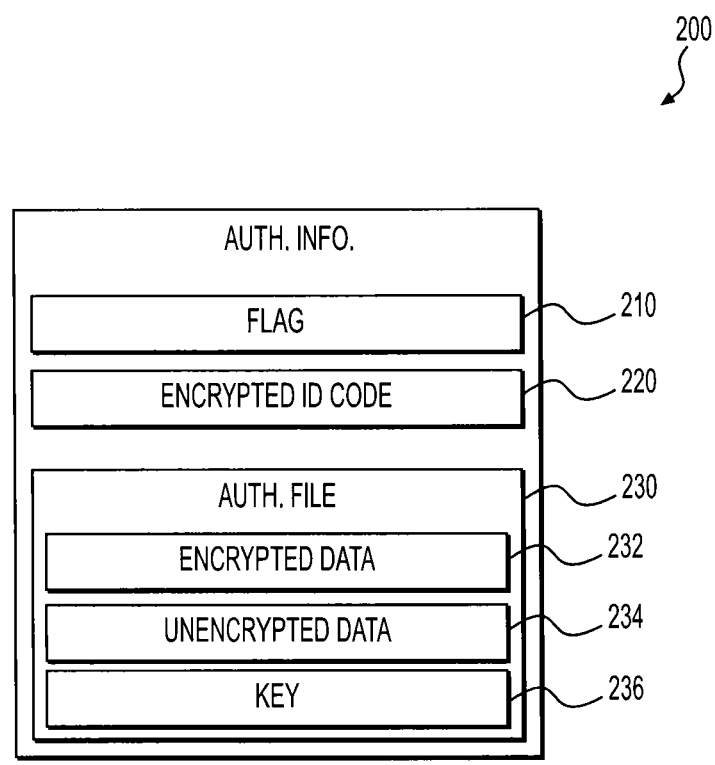
FIG. 2 shows an example of a set of authentication information 200 according to an embodiment of the disclosure.

FIG. 2 shows an example of a set of authentication information 200 according to an embodiment of the disclosure. In some embodiments, the set of authentication information 200 is usable as the set of authentication information 144 in FIG. 1. The set of authentication information 200 includes a flag 210, an encrypted ID code 220, and an authentication file 230. The authentication file 230 includes an encrypted portion 232 for keeping encrypted data, an unencrypted portion 234 for keeping unencrypted data, and a key usable for decrypting the encrypted data in the encrypted portion 232 of the authentication file 230. In some embodiments, only a portion of the components depicted in FIG. 2 is included in a set of authentication information. In some embodiments, only a portion of the components depicted in FIG. 2 is transmitted to the server 180 when performing an online authentication process.

During operation, in an example, one of the client applications 142 queries the positioning circuitry 150 for the location of the wireless device 120. The positioning circuitry 150 sends a request to the authentication system 170 requesting for authorization to access a set of positioning information usable to aid the positioning circuitry 150 with respect to determining the location of the wireless device 120. Authentication system 170 prepares and/or obtains a set of authentication information 144 stored in the storage device 140. Based on various criteria, authentication system 170 determined whether an online authentication or an offline authentication is to be performed.

In some embodiments, when the communication circuitry 160 has established a data connection with server 180 via the network 110, the authentication system 170 may opt for performing an online authentication. In some embodiments, when the communication circuitry 160 has established the data connection with server 180 and when the storage device 140 does not have a set of positioning data that is up-to-date, the authentication system 170 may opt for performing an online authentication. In some embodiments, when the communication circuitry 160 does not have a data connection with server 180 and when the storage device 140 has a set of positioning data that is up-to-date, the authentication system 170 may opt for performing an offline authentication. In an example when the communication circuitry 160 does not have a data connection with server 180 and when the storage device 140 does not have a set of positioning data that is up-to-date, the communication circuitry 160 determines the location of the wireless device 120 without the assistance of a set of positioning data downloaded from the server.

During operation, in an example, the authentication system 170 performs the offline authentication. In some embodiments, the authentication system 170 retrieves subscription information from the authentication information 144 and time information from positioning circuitry 150. In an example, the data descriptor decrypted the encrypted portion 232 of the authentication file 230 in the authentication information 200. The authentication system 170 compares the subscription information with the time information and determines of the subscription is still valid. In an embodiment, the authentication system 170 authorizes to the processor 130 to access the set of positioning data 146 stored in storage device 140 and provide the set of positioning data 146 to the positioning circuitry 150 when the subscription information is valid.

During operation, in an example, the authentication system 170 performs the online authentication by transmitting at least a portion of the authentication information 200 to the server 180. The server 180 determines if the wireless device is authorized to download a set of positioning data from the server 180. In some embodiments, the server 180 informs the authentication system 170 that the wireless device is authorized by sending a set of positioning data as requested to the wireless device 120. In some embodiments, the set of positioning data to be sent to the wireless device 120 is retrieved from the positioning data database 186 based on a value of a flag of the set of authentication information. In some embodiments, the value of the flag is indicative of a type of the set of positioning data to be used by the positioning circuitry 150, such as positioning data for the satellite-based positioning circuitry 152 or positioning data for the wireless station-based positioning circuitry 154.

In some embodiments, the server 180 informs the authentication system 170 that the wireless device 120 is not authorized by sending an error message to the wireless device 120. In one example, the server 180 informs the authentication system 170 that the wireless device is not authorized by sending nothing to the wireless device 120, where a lack of response from the server 180 after a predetermined threshold time period is indicative of the wireless device 120 being not authorized.

Figure 3:
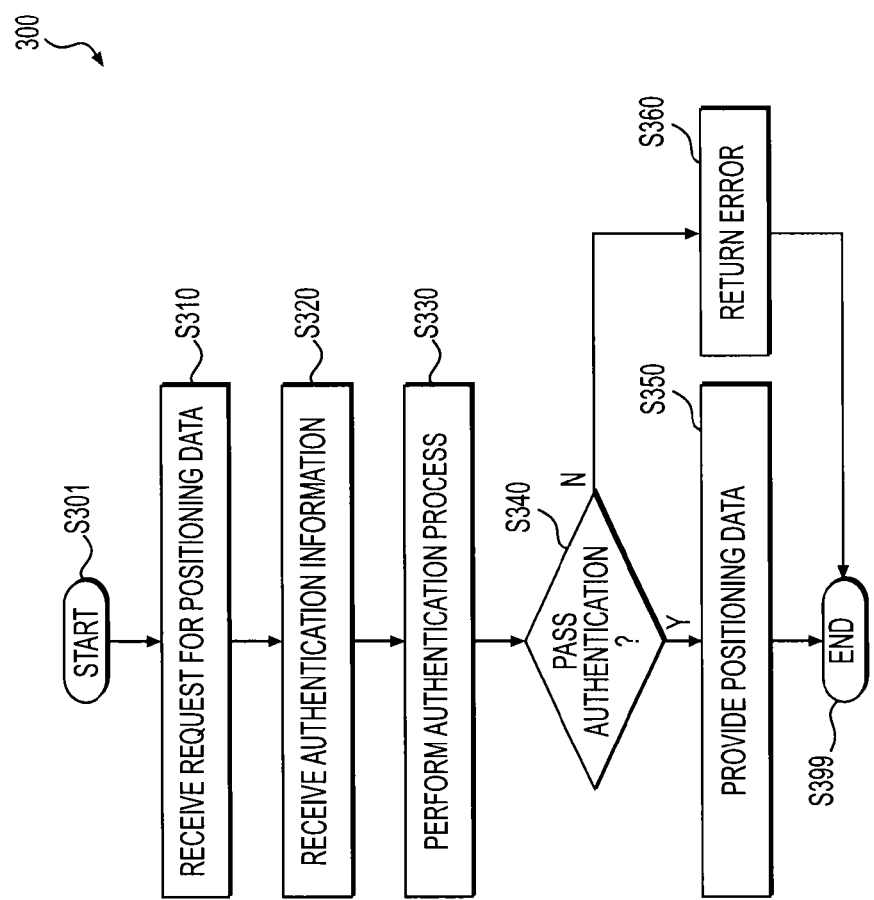
FIG. 3 shows a flow chart outlining a process example 300 according to an embodiment of the disclosure.
Figure 4:
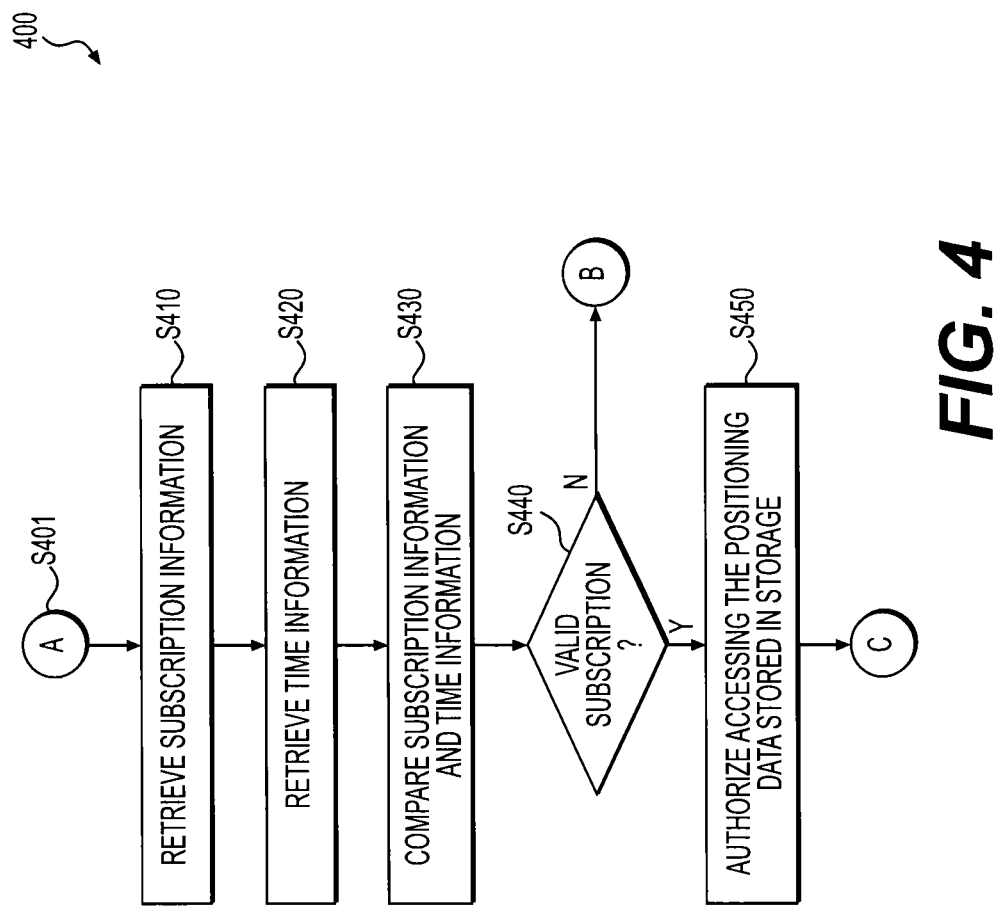
FIG. 4 shows a flow chart outlining a process example 400 according to an embodiment of the disclosure.
Figure 5:
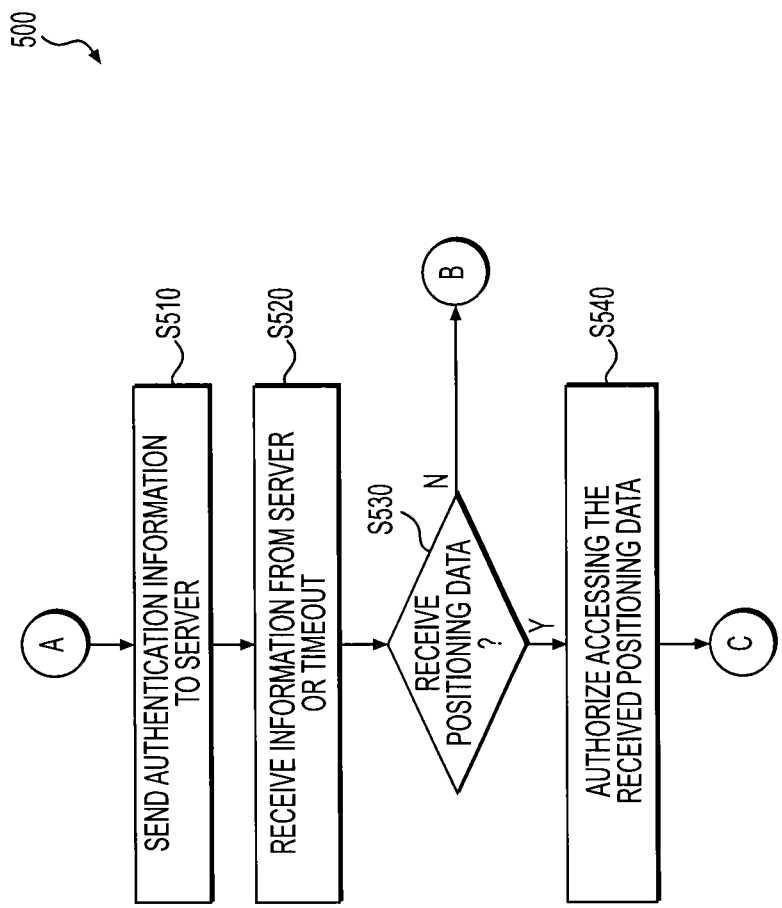
FIG. 5 shows a flow chart outlining a process example 500 according to an embodiment of the disclosure.

Further details regarding the operations of various components of wireless device 120 and server 180 in conjunction with the authentication information 200 are further described in conjunction with process examples depicted in FIGS. 3-5.

FIG. 3 shows a flow chart outlining a process example 300 according to an embodiment of the disclosure. In an example, the process 300 is executed by the wireless device 120. The process 300 starts at S301 and proceeds to S310.

At S310, a client application executed by the processor 130 asks for the positioning circuitry 150 for the location of the wireless device 120. The positioning circuitry 150 sends a request to the authentication system 170 for a set of positioning data usable to expedite the process for determining the location of the wireless device 120. In an example, the authentication system 170 receives the request including a flag having a flag value indicating the type of positioning data is being requested.

At S320, the authentication system 170 receives authentication information associated with the wireless device 120. In some embodiments, the authentication information corresponds to a set of authentication information 144 in FIG. 1 and further illustrated in conjunction with FIG. 2. In some embodiments, the authentication information corresponds to information to be used to form or update the set of authentication information 144.

In an example, the data collector 173 of the authentication system 170 updates the flag 210 in the set of authentication information 144 based on the flag value in the request from the positioning circuitry 150. In some embodiments, after receiving the authentication information, the authentication system 170 generates the set of authentication information 144 and stores the set of authentication information 144 in the storage device 140.

In some embodiments, the authentication file 230 of the set of authentication information 144 is predetermined and pre-recorded in the storage device 140 by a manufacture of the wireless device. In an example, the data collector 173 retrieves the flag 210, the encrypted ID code 220, and the authentication file 230 from various components of the wireless device 120 and arranges them as the authentication information 144. In one example, the data collector 171 of the authentication system 170 retrieves a device ID corresponding to communication circuitry 160 of the wireless device 120 or corresponding to the positioning circuitry 150 of the wireless device 120; and the data encryptor 172 encrypts the device ID as an encrypted ID code 220 of the set of authentication information 144.

At S330, the authentication system 170 performs an authentication process for the wireless device 120 based on the set of authentication information 144. The authentication system 170 determines whether to perform the authentication process online or offline based on various factors as illustrated above.

At S340, the authentication system 170 determines whether the wireless device 120 passes the authentication process. If the wireless device 120 passes the authentication process, the process proceeds to S350. If the wireless device 120 fails the authentication process, the process proceeds to S360.

At S350, the authorized wireless device 120 is provided with a set of positioning data that aids the positioning circuitry 150 of the wireless device 120 to determine a location of the wireless device.

At S360, the authentication system 170 returns an error message to the positioning circuitry 150. As a result, positioning circuitry 150 determines the location of the wireless device 120 without the assistance of the set of positioning data.

After either S350 or S360, the process proceeds to S399 and terminates.

S330-S350 will be further illustrated in conjunction with FIG. 4 for performing an offline authentication process and with FIG. 5 for performing an online authentication process.

FIG. 4 shows a flow chart outlining a process example 400 according to an embodiment of the disclosure. In an example, the process 400 is executed by the wireless device 120 for performing an offline authentication process. The process 400 starts at process node A and proceeds to S410. In some embodiments, process node A corresponds to S320 in FIG. 3.

At S410, the data decryptor 176 of the authentication system 170 retrieves subscription information from the set of authentication information 144. In an example, the data decryptor 176 decrypts an encrypted portion 232 of an authentication file 230 of the set of authentication information 144 based on a key 236 of the authentication file 230.

At S420, the validity checker 177 retrieves the time information from the positioning circuitry 170 of the wireless device 120. As such, whether the subscription information associated with the wireless device 120 for accessing the set of positioning data is determined based on the time information that is unlikely to be altered by a user of the wireless device.

At S430, the validity checker 177 compares the subscription information the time information. In some embodiments, S410-S430 correspond to S330 in FIG. 3.

At S440, if the validity checker 177 determines that the subscription information is valid, the process proceeds to S450; and if the validity checker 177 determines that the subscription information expires, the process proceeds to process node B. In some embodiments, S440 corresponds to S340 in FIG. 3; and process node B corresponds to S360 in FIG. 3.

At S450, the authentication system 170 authorizes the wireless device 120 to access the set of positioning data 146 stored in the storage device 140 when the subscription information is valid. In some embodiments, S450 corresponds to S350 in FIG. 3.

After S450, the process proceeds to process node C. In some embodiments, process node C corresponds to S399 in FIG. 3.

FIG. 5 shows a flow chart outlining a process example 500 according to an embodiment of the disclosure. In an example, the process 500 is executed by the wireless device 120 for performing an online authentication process. The process 500 starts at process node A and proceeds to S510. In some embodiments, process node A corresponds to S320 in FIG. 3.

At S510, the data detector 171, the data encryptor 172, and/or the data collector 173 provide a set of authentication information 144. The authentication system 170 receives and sends authentication information, such as a portion or all of the set of authentication information 144, to the server 180 via the communication circuitry 160. In some embodiments, not all data entries in the set of authentication information 144 as illustrated in FIG. 2 are in the set of authentication information 144 sent to the server. In some embodiments, not all data entries in the set of authentication information 144 are required by the server 180, and thus only a portion of the set of authentication information 144 is sent.

At S520, the authentication system 170 receives feedback information from the server 180 via the communication circuitry 160 as a result of an authentication process performed by the server 180 based on the authentication information sent at S510. In some embodiments, the server 180 sends back a set of positioning data as requested by the authentication information and indicating that the wireless device 120 is authorized to access the set of positioning data. In some embodiments, the server 180 sends back an error message indicating that the wireless device 120 is not authorized to download the set of positioning data form the server 180. In some embodiments, the process proceeds to S530 if the authentication system 170 does not receive any information from the server 180 for a predetermined timeout period after sending the authentication information at S510.

In some embodiments, S510-S520 correspond to S330 in FIG. 3.

At S530, if the authentication system 170 receives a set of positioning data from the server 180, the process proceeds to S540; and if the authentication system 170 receives the error message from the server 180 or does not receive any information from the server after timeout, the process proceeds to process node B. In some embodiments, S530 corresponds to S340 in FIG. 3; and process node B corresponds to S360 in FIG. 3.

At S540, the authentication system 170 authorizes the wireless device 120 to access the set of positioning data received from the server 180. In some embodiments, the authentication system 170 stores the set of positioning data received from the server 180 in the storage device 140. In some embodiments, S540 corresponds to S350 in FIG. 3.

After S540, the process proceeds to process node C. In some embodiments, process node C corresponds to S399 in FIG. 3.

Figure 6:
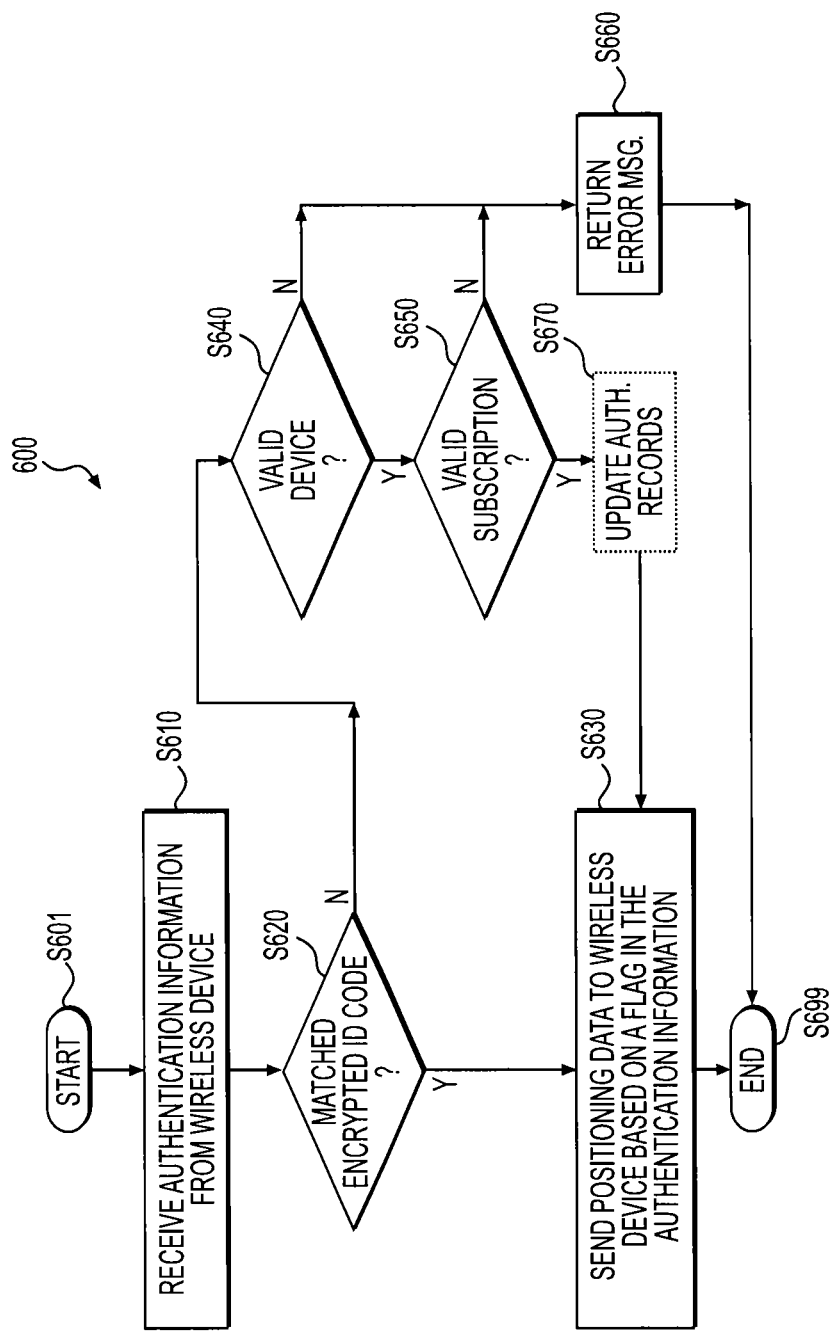
FIG. 6 shows a flow chart outlining a process example 600 according to an embodiment of the disclosure.

FIG. 6 shows a flow chart outlining a process example 600 according to an embodiment of the disclosure. In an example, the process 600 is executed by the server 180 for performing an authentication process in response to receiving a set of authentication information from the wireless device 120. The process 600 starts at S601 and proceeds to S610.

At S610, the server 180 receives authentication information from the wireless device 120. In one example, the received authentication information corresponds to the set of authentication information 200 as described in conjunction with FIG. 2. In some embodiments, the received authentication information includes one or more of a flag 210, an encrypted ID code 220, and/or an authentication file.

At S620, the server 180, by executing one of the server application 184a, determines whether the encrypted ID code 220 of the received authentication information has a match in an authentication record 184b. In one embodiment, the server 180 does not perform a decryption process on the encrypted ID code 220. In an example, the authentication record 184b includes a list of encrypted ID codes of authorized wireless devices. In some embodiments, at least a portion of encrypted ID codes of authorized wireless devices is provided by a manufacture of wireless devices and/or of integrated circuit chips corresponding to the positioning circuitry 150, the communication circuitry 160, or other components of a wireless device. In some embodiments, the list of encrypted ID codes of authorized wireless devices in the authentication record can be edited, added, or removed by a service provider that provides the positioning data. In some embodiments, the list of encrypted ID codes of authorized wireless devices in the authentication record can be edited, added, or removed by the server 180 according to one of the server applications 184b configured to perform authentication record management.

Furthermore, at S620, if the received encrypted 1D code has a match in the authentication record 184b, the process proceeds to S620; and if the received encrypted ID code fails to have a match in the authentication record 184b, the process proceeds to S640.

In at least one embodiment, S620 is omitted, and the process proceeds to S640 after S610. In at least one embodiment, S640-S650 are omitted, and the process proceeds to S660 if the received encrypted ID code fails to have a match in the authentication record 184b.

At S630, as an authentication result indicating that the wireless device 120 passes the authentication process and is an authorized wireless device 120, a set of positioning data is transmitted to the wireless device 120. In some embodiments, the set of positioning data is retrieved from the positioning data database 186 based on a flag value of the flag in the received authentication information.

At S640, the server 180 determines whether the wireless device 120 is valid based on an authentication file 230 of the received authentication information. The server 180 retrieves authentication data associated with the wireless device 120 from the authentication file 230. In one embodiment, the authentication data is encrypted and stored in an encrypted portion 232 of the authentication file 230. In one embodiment, the authentication data is unencrypted and stored in an unencrypted portion 234 of the authentication file 230. Furthermore, at S640, if the server determines that wireless device 120 is valid, the process proceeds to S650; and if the server 180 determines that the wireless device 120 is invalid, the process proceeds to S660.

At S650, the server 180 obtaining subscription information associated with the wireless device 120 based on the authentication data retrieved from the received authentication file. In some embodiments, the subscription information of authorized wireless devices is provided by a manufacture of wireless devices and/or of integrated circuit chips corresponding to the positioning circuitry 150, the communication circuitry 160, or other components of a wireless device. In some embodiments, the subscription information of authorized wireless devices can be edited, added, or removed by a service provider that provides the positioning data. In some embodiments, the subscription information of authorized wireless devices can be edited, added, or removed by the server 180 according to one of the server applications 184b configured to perform subscription information management.

Furthermore, at S650, the server 180 determines whether the subscription information associated with the wireless device 120 is valid. If the server 180 determines that the subscription information associated with the wireless device 120 is valid, the process proceeds to S670 or S630; and if the server 180 determines that the subscription information associated with the wireless device 120 is invalid, the process proceeds to S660.

At S660, as an authentication result indicating that the wireless device 120 does not pass the authentication process, the server 180 sends an error message to the wireless device 120. In at least one embodiments, S660 is omitted, and the negative authentication result is implicitly conveyed to the wireless device 120 by avoid sending a set of positioning data as requested for a predetermined timeout period.

At S670, the server 180 updates the authentication record 184b after the server 180 determines that the wireless device 120 is valid (S640) and the subscription information associated with the wireless device 120 is valid (S650). In some embodiments, the server 180 adds the encrypted ID code in the received authentication information into the authentication record 184b when the wireless device 120 and the corresponding subscription information are valid. Moreover, in one example, the server 180 determines whether the authentication record 184b is full before adding the encrypted ID code into the authentication record 184b. For example, in one embodiment, if the number of encrypted ID codes stored in the authentication record 184b exceeds a predetermined threshold number, the server 180 omits S670.

Furthermore, in some embodiments, S670 is omitted, and the process proceeds to S630 after S650.

After either S630 or S660, the process proceeds to S699 and terminates.

The features as described in reference to FIGS. 1-6 can be implemented in one or more computer programs that are performed by a processing system, including at least one programmable processor coupled to received data and instructions from, and to transmit data and instructions, to a data storage system, at least one input device, and at least one output device. A computer program is sets of instructions that can be used, directly or indirectly, in a computer to perform a certain activity or bring about a certain result. A computer program can be written in any form of programming language (e.g., Java, Objective-C, and the like), including compiled or interpreted languages, and can be deployed in any form, including as a stand-alone program or as a module, component, a browser-based web application, or other unit suitable for use in a computing environment.

The features can be performed in a computer system that can include a back-end component (e.g., a data server), or that can include a middleware component (e.g., an application server), or that can include a front-end component (e.g., a computer having a graphical user interface or an Internet browser, or any combination of them). The components of the system can be connected by any form or medium of data communication networks. In some implementations, communication networks can include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for determining a location of a user device, the method comprising:
  retrieving a device identifier (ID) corresponding to communication circuitry of the user device or corresponding to positioning circuitry of the user device;
  encrypting the retrieved device ID as an encrypted ID code;
  sending, by the user device, authentication information that includes the encrypted ID code to authentication processing circuitry;
  receiving, by the user device from the authentication processing circuitry, an authentication result of an authentication process that is performed by the authentication processing circuitry, the authentication process including:
    matching the encrypted ID code with an authentication record; and
    when the encrypted ID code fails to have a match in the authentication record, performing:
      determining whether the user device is valid based on an authentication file included in the authentication information;
      obtaining subscription information based on the authentication file when the user device is valid; and determining whether the subscription information is valid;

receiving a set of positioning assistance data that corresponds to a value of a flag included in the authentication information from a server when the user device and the subscription information are valid; and when the authentication result indicates that the user device is an authorized user device, providing the positioning circuitry of the user device with the set of positioning assistance data that aids the positioning circuitry of the user device to determine a location of the user device.

2. The method of claim 1, further comprising:

sending the authentication information to the server, the server including the authentication processing circuitry; and receiving the set of positioning assistance data from the server when the authentication result indicates that the user device is the authorized user device.

3. The method of claim 2, further comprising:

storing the received set of positioning assistance data in a storage device of the user device.

4. The method of claim 1, further comprising:

setting the value of the flag included in the authentication information, the value of the flag being indicative of a type of the set of positioning assistance data to be used by the positioning circuitry of the user device.

5. An apparatus, comprising:

communication circuitry;

positioning circuitry; and processing circuitry configured to:

retrieve a device identifier (ID) corresponding to the communication circuitry or corresponding to the positioning circuitry;

encrypt the retrieved device ID as an encrypted ID code;

send authentication information that includes the encrypted ID code to authentication processing circuitry;

receive from the authentication processing circuitry an authentication result of an authentication process that is performed by the authentication processing circuitry, the authentication process including:

matching the encrypted ID code with an authentication record; and when the encrypted ID code fails to have a match in the authentication record, performing:

determining whether the user device is valid based on an authentication file included in the authentication information;

obtaining subscription information based on the authentication file when the user device is valid; and determining whether the subscription information is valid;

receiving a set of positioning assistance data that corresponds to a value of a flag included in the authentication information from a server when the user device and the subscription information are valid; and when the authentication result indicates that the apparatus is an authorized user device, provide the positioning circuitry with the set of positioning assistance data that aids the positioning circuitry to determine a location of the apparatus.

6. The apparatus of claim 5, wherein the positioning circuitry comprises one or more of the following:

satellite-based positioning circuitry; or wireless station-based positioning circuitry.

7. The apparatus of claim 5, wherein the processing circuitry is further configured to:

send, through the communication circuitry, the set of authentication information to the server, the server including the authentication processing circuitry; and receive, through the communication circuitry, the set of positioning assistance data from the server when the authentication result indicates that the apparatus is the authorized user device.

8. The apparatus of claim 7, wherein the processing circuitry is further configured to:

store the received set of positioning assistance data in a storage device of the apparatus.

9. The apparatus of claim 5, wherein the processing circuitry is further configured to:

set the value of the flag included in the authentication information, the value of the flag being indicative of a type of the set of positioning assistance data to be used by the positioning circuitry of the apparatus.

10. A method for authenticating a user device, the method comprising:

receiving authentication information from the user device, the authentication information including an encrypted identifier (ID) code that is an encrypted device ID corresponding to communication circuitry of the user device or corresponding to positioning circuitry of the user device;

performing, by authentication processing circuitry, an authentication process for the user device, the authentication process including:

matching the encrypted ID code with an authentication record; and when the encrypted ID code fails to have a match in the authentication record, performing:

determining whether the user device is valid based on an authentication file included in the authentication information;

obtaining subscription information based on the authentication file when the user device is valid; and determining whether the subscription information is valid;

sending a set of positioning assistance data that corresponds to a value of a flag included in the authentication information to the user device when the user device and the subscription information are valid; and sending an authentication result to the user device, the authentication result indicating whether the user device passes the authentication process such that the positioning circuitry of the user device is authorized to use the set of positioning assistance data to determine a location of the user device when the user device passes the authentication process.

11. The method of claim 10, wherein sending the authentication result includes sending the set of positioning assistance data that corresponds to a value of a flag included in the authentication information to the user device when the encrypted ID code has a match in the authentication record.

12. The method of claim 10, further comprising sending an error message to the user device when the user device is invalid or when the subscription information is invalid.

13. The method of claim 10, further comprising:

adding the encrypted ID code into the authentication record when the user device and the subscription information are valid.

14. The method of claim 10, wherein determining whether the user device is valid is performed based on an encrypted portion of the authentication file.

15. The method of claim 10, wherein determining whether the user device is valid is performed based on an unencrypted portion of the authentication file.

* * * * *